(12) United States Patent
Kitamura (10) Patent No.: US 9,195,423 B2
(45) Date of Patent: Nov. 24, 2015

(54) IMAGE FORMING APPARATUS, IMAGE FORMING METHOD

(71) Applicant: Kyocera Document Solutions Inc., Osaka (JP)

(72) Inventor: Tetsuro Kitamura, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/266,792

(22) Filed: Apr. 30, 2014

(65) Prior Publication Data

US 2014/0320920 A1    Oct. 30, 2014

(30) Foreign Application Priority Data

Apr. 30, 2013   (JP) .................................. 2013-095788

(51) Int. Cl.
*G06K 15/00* (2006.01)
*G06F 3/12* (2006.01)
*H04N 1/21* (2006.01)

(52) U.S. Cl.
CPC ............. *G06F 3/126* (2013.01); *G06F 3/1217* (2013.01); *G06F 3/1285* (2013.01); *H04N 1/21* (2013.01); *Y02B 60/1271* (2013.01)

(58) Field of Classification Search
CPC ........... H04N 1/00891; H04N 1/00928; Y02B 60/1267; Y02B 60/1271; G06F 1/3284; G06F 1/1221; G06F 3/1229; G06F 3/126; G06F 3/1261; G06F 3/1263

USPC ........ 358/1.11–1.18, 400–404, 504; 713/300, 713/323, 324; 718/100, 102–104, 106–108; 399/37, 75

See application file for complete search history.

(56) References Cited

U.S. PATENT DOCUMENTS

| | | | |
|---|---|---|---|
| 8,374,521 B2* | 2/2013 | Nishikawa | 399/82 |
| 8,441,657 B2* | 5/2013 | Koike | 358/1.14 |
| 2004/0099166 A1* | 5/2004 | Blom et al. | 101/483 |
| 2008/0316532 A1* | 12/2008 | Fukuda | 358/1.15 |
| 2009/0059290 A1* | 3/2009 | Kurahashi | 358/1.15 |
| 2009/0222403 A1* | 9/2009 | Kato | 707/1 |
| 2010/0195141 A1* | 8/2010 | Fan et al. | 358/1.15 |
| 2013/0013946 A1* | 1/2013 | Hamada | 713/323 |

FOREIGN PATENT DOCUMENTS

JP       2007-288284 A       11/2007

* cited by examiner

*Primary Examiner* — Chad Dickerson
(74) *Attorney, Agent, or Firm* — James W. Judge (57) ABSTRACT

An image forming apparatus includes: an operation-suspended-period storage unit configured to store a start time and an ending time of an operation suspended period; a job-data storage unit configured to store a job including a start time of execution the job of which is reserved; a job-execution-period calculation unit configured to acquire the start time of execution of the reserved job from the job-data storage unit so as to calculate an execution period from the start time until the completion time of the execution based on a type of the job; and a job-execution-period changing unit configured to change the execution period of the reserved job to be prior to the operation suspended period when the calculated execution period of the reserved job overlaps the operation suspended period at a predetermined period of time before the operation suspended period stored in the operation-suspended-period storage unit.

8 Claims, 7 Drawing Sheets

| Function | Function Restriction Time |
|---|---|
| FAX | 2 Minutes |
| Copy | 30 Seconds |
| Scan | 20 Seconds |

| Function | Function Restriction Time |
|---|---|
| FAX | 2 Minutes |
| Copy | 30 Seconds |
| Scan | 20 Seconds |

IMAGE FORMING APPARATUS, IMAGE FORMING METHOD

CROSS-REFERENCE TO RELATED APPLICATION

This application is based upon, and claims the benefit of priority from, corresponding Japanese Patent Application No. 2013-095788 filed in the Japan Patent Office on Apr. 30, 2013, the entire contents of which are incorporated herein by reference.

BACKGROUND

Unless otherwise indicated herein, the description in this section is not prior art to the claims in this application and is not admitted to be prior art by inclusion in this section.

There is provided an image forming apparatus such as a multifunctional peripheral (MFP) that can print a document and an image. Planned blackouts are sometimes carried out due to the electric power supply and demand urgency in recent years. However, during the planned blackout, when the image forming apparatus suspends operating, it becomes obviously impossible to execute the reserved job at that time. This reduces the convenience for the user.

This type of problems have been dealt with by disposing a backup power supply. There is a technique that derives a predicted value of the power consumption required for completing the execution of the unexecuted reserved job and executes the unexecuted reserved job using the backup power supply when the remaining amount of the backup power supply is reduced to the predicted value when switching from the main power supply to the backup power supply. This technique ensures completing the execution of the reserved job before the backup power supply is run out and the reserved job disappears even when the blackout of the main power supply is prolonged.

SUMMARY

An image forming apparatus according to the disclosure includes an operation-suspended-period storage unit, a job-data storage unit, a job-execution-period calculation unit, and a job-execution-period changing unit. The operation-suspended-period storage unit is configured to store a start time and an ending time of an operation suspended period. The job-data storage unit is configured to store a job including a start time of execution. The execution of the job is reserved. The job-execution-period calculation unit is configured to acquire the start time of execution of the reserved job from the job-data storage unit so as to calculate an execution period from the start time until the completion time of the execution based on a type of the job. The job-execution-period changing unit is configured to change the execution period of the reserved job to be prior to the operation suspended period when the calculated execution period of the reserved job overlaps the operation suspended period at a predetermined period of time before the operation suspended period stored in the operation-suspended-period storage unit.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Configuration of Image Forming Apparatus 1 According to Embodiment

Figure 1:
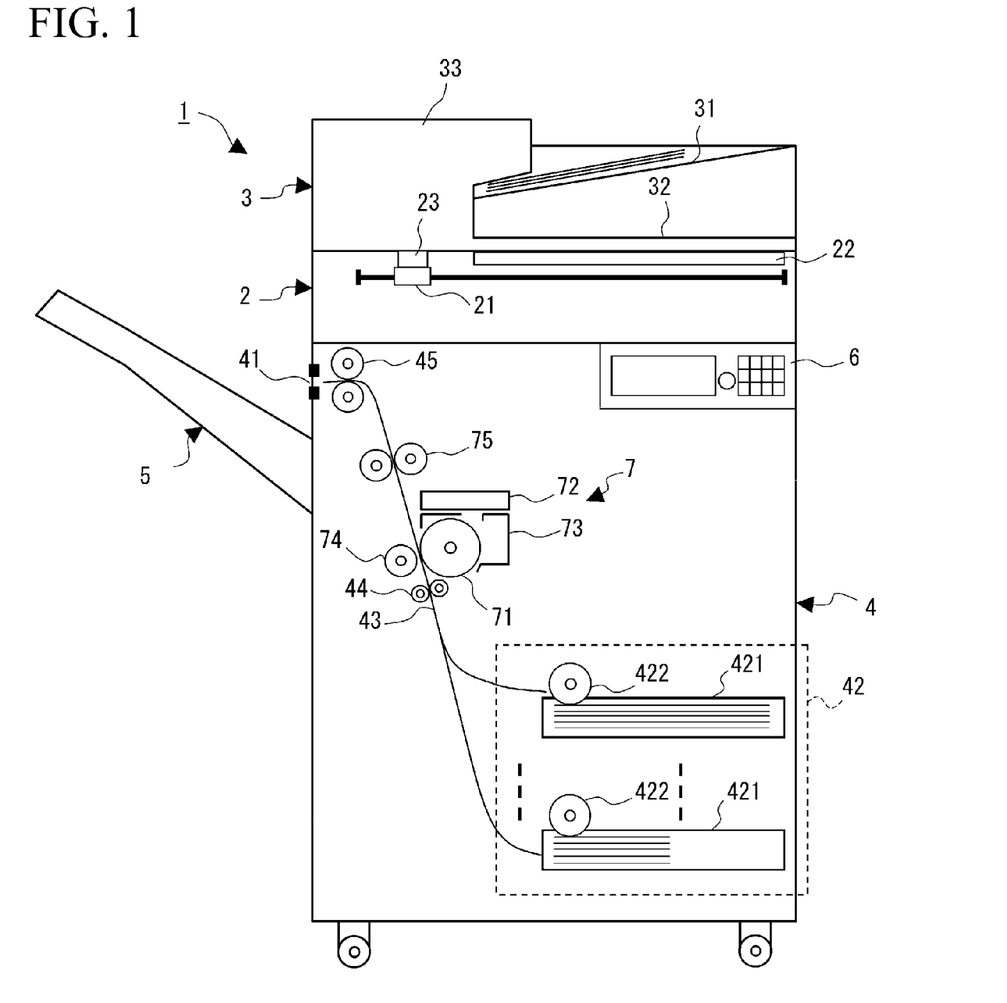
FIG. 1 illustrates an internal constitution of an image forming apparatus according to one embodiment of the disclosure.

Next, a description will be given of the configuration of an image forming apparatus 1 according to an embodiment of the disclosure in detail with reference to FIG. 1. According to FIG. 1, the image forming apparatus 1 according to the embodiment includes a document reading unit 2, a document feeding unit 3, a main unit 4, a stack tray 5, and an operation panel unit 6. The document reading unit 2 is arranged on top of the main unit 4. The document feeding unit 3 is arranged on top of the document reading unit 2. The stack tray 5 is arranged on a discharge port 41 side of recording sheets. The discharge port 41 is formed in the main unit 4. The operation panel unit 6 is arranged on the front side of the image forming apparatus 1.

The document reading unit 2 includes a scanner 21, a platen glass 22, and a document reading slit 23. The scanner 21 is constituted of an exposure lamp, a charge coupled device (CCD), a complementary metal oxide semiconductor (CMOS) imaging sensor, and similar member. The scanner 21 is configured to be move in the conveyance direction of the original document by the document feeding unit 3. The platen glass 22 is a platen constituted of a transparent member such as glass. The document reading slit 23 has a slit formed in a direction perpendicular to the conveyance direction of the original document by the document feeding unit 3.

To read the original document placed on the platen glass 22, the scanner 21 is moved to the position facing the platen glass 22. Subsequently, the scanner 21 acquires image data by reading the original document while scanning the original document placed on the platen glass 22, so as to output the acquired image data to the main unit 4. To read the original document conveyed by the document feeding unit 3, the scanner 21 is moved to the position facing the document reading slit 23. Subsequently, the scanner 21 acquires image data via the document reading slit 23 by reading the original document in synchronization with the conveying operation of the original document by the document feeding unit 3, so as to output the acquired image data to the main unit 4.

The document feeding unit 3 includes a document placement portion 31, a document discharging portion 32, and a document conveying mechanism 33. The original document placed on the document placement portion 31 is sequentially fed one by one by the document conveying mechanism 33, conveyed to the position facing the document reading slit 23, and then discharged to the document discharging portion 32. Here, the document feeding unit 3 is constituted to be collapsible. Lifting up the document feeding unit 3 ensures opening the top surface of the platen glass 22.

The main unit 4 includes an image forming unit 7, and also includes a paper sheet feeder 42, a paper sheet conveyance passage 43, a conveyance roller 44, and a discharge roller 45. The paper sheet feeder 42 includes a plurality of sheet feed cassettes 421 and a plurality of paper feed rollers 422. The sheet feed cassettes 421 stores respective recording sheets having different sizes or orientations. The paper feed rollers 422 feed the recording sheet one by one to the paper sheet conveyance passage 43 from the sheet feed cassette 421. The paper feed roller 422, the conveyance roller 44, and the discharge roller 45 function as a conveying unit. This conveying unit conveys the recording sheet. The recording sheet, which is fed to the paper sheet conveyance passage 43 by the paper feed roller 422, is conveyed to the image forming unit 7 by the conveyance roller 44. The recording sheet on which recording is performed by the image forming unit 7 is discharged to the stack tray 5 by the discharge roller 45.

The operation panel unit 6 includes a displaying portion such as an LCD, a start key, a numeric keypad, a button for switching action modes, a button for issuing an instruction for execution of a job, a touch panel, and similar member. The action modes include copy, FAX transmission, scanner, and similar mode. The job relates to printing, transmission, saving, recording or similar job of a selected document. That is, the operation panel unit 6 acquires the instructions of various jobs 95 of the image forming apparatus 1 from the user. Additionally, the operation panel unit 6 can input and change the information of each user in account information 90.

The image forming unit 7 includes a photoreceptor drum 71, an exposing portion 72, a developing portion 73, a transfer portion 74, and a fixing portion 75. The exposing portion 72 is an optical unit that includes a laser device, an LED array, a mirror, and a lens, and similar member. The exposing portion 72 outputs a light or similar radiation based on the image data to expose the photoreceptor drum 71, so as to form an electrostatic latent image on the surface of the photoreceptor drum 71. The developing portion 73 is a developer unit that develops the electrostatic latent image formed on the photoreceptor drum 71 using a toner. The developing portion 73 forms a toner image based on the electrostatic latent image on the photoreceptor drum 71. The transfer portion 74 transfers the toner image formed on the photoreceptor drum 71 by the developing portion 73 to the recording sheet. The fixing portion 75 heats the recording sheet to which the toner image is transferred by the transfer portion 74 so as to fix the toner image to the recording sheet.

Figure 2:
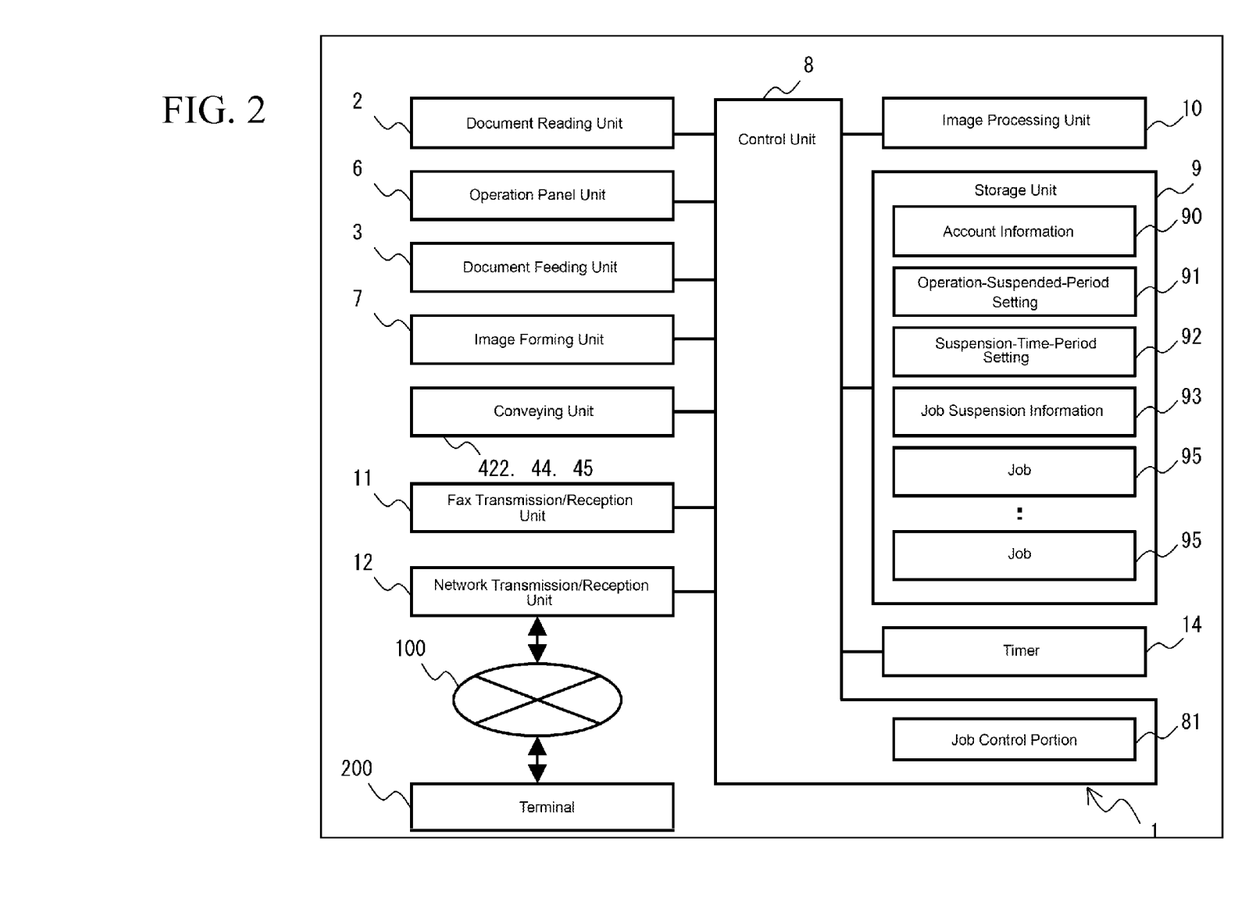
FIG. 2 illustrates a control configuration of the image forming apparatus according to the one embodiment.

FIG. 2 illustrates a schematic configuration of the image forming apparatus 1. The above-described document reading unit 2, document feeding unit 3, conveying unit (the paper feed roller 422, the conveyance roller 44, and the discharge roller 45), operation panel unit 6, and image forming unit 7 (image forming unit) are each connected to a control unit 8. Accordingly, the control unit 8 controls the respective operations of these units. Additionally, the control unit 8 is connected to a storage unit 9 (storage unit), an image processing unit 10 (image processing unit), a FAX transmission/reception unit 11, a network transmission/reception unit 12, and similar member.

The control unit 8 is an information processing unit such as a microcomputer that includes a read only memory (ROM), a random access memory (RAM), and similar member. The ROM stores a control program for performing the operation control of the image forming apparatus 1. The control unit 8 and the image processing unit 10 each read out the control program stored in the ROM and loads the control program on the RAM, so as to perform a control on the overall apparatus corresponding to predetermined instruction information input from the operation panel unit 6. Additionally, the control unit 8 includes a job control portion 81 (a job-execution-period calculation unit, a job-execution-period changing unit, a job-execution suspending unit, a post-resume-job continuing unit, a job-non-completion estimation notifying unit, a job-execution restricting unit, and an operation-suspended-period acquiring unit).

The job control portion 81 acquires an operation suspended period from a website or similar source. Additionally, the job control portion 81, at a predetermined period of time before the operation suspended period, performs a process for changing the execution period of a scheduled job to be prior to the operation suspended period if the execution period of the scheduled job overlaps the operation suspended period. When the execution of this scheduled job is not to be completed during the operation suspended period, the job control portion 81 suspends the uncompleted job in course of the job and saves suspension information. Additionally, the job control portion 81 can read out the saved job suspension information during resuming to continue the suspended job. Additionally, when the job control portion 81 receives the execution instruction of the job at or after the predetermined period of time before the operation suspended period, the job control portion 81 notifies incompletion of the execution of the job. Additionally, the job control portion 81 restricts execution, discriminating by job type, when the predetermined period of time ahead of the operation suspended period has arrived.

The storage unit 9 is storage unit that employs a storage medium such as a semiconductor memory and a hard disk drive (HDD). The details of the data stored in the storage unit 9 will be described later.

The image processing unit 10 is a control operation unit such as a digital signal processor (DSP) and a graphics processing unit (GPU). The image processing unit 10 is a unit for performing a predetermined image processing on image data, and performs various image processings including image improvement processings such as enlargement/reduction processing, print density adjustment, and gradation adjustment. The image processing unit 10 can convert the image read by the document reading unit 2 into a file unit in a format such as PDF and TIFF and then store the file unit in the storage unit 9 as the job 95.

The FAX transmission/reception unit 11 is a unit for performing facsimile transmission/reception, and is connected to an ordinary telephone line, an ISDN line, or similar line. Additionally, the FAX transmission/reception unit 11 can store a received facsimile image in the storage unit 9. Additionally, the FAX transmission/reception unit 11 ensures facsimile transmission instead of printing image data or print data stored in the storage unit 9 by the image forming unit 7.

The network transmission/reception unit 12 is a unit for connecting to an external network 100. The network transmission/reception unit 12 includes a LAN board, a wireless transceiver, a telephone dialer, a coupler, and similar unit for connecting to the network 100. The network 100 is a network such as LAN, WAN, and a mobile phone network. The network transmission/reception unit 12 is connected to a terminal 200 via the network 100. The network transmission/reception unit 12 receives an operation-suspended-period setting 91 and the job 95 from the terminal 200, thus receiving various instructions. Additionally, the network transmission/reception unit 12 transmits various notifications to the terminal 200. The terminal 200 is a terminal that ensures Internet connection to, for example, a personal computer (PC), a smart phone, a mobile phone, and a game machine of the user.

A timer 14 is a timer with a battery backup or similar timer. The timer 14 can acquire the current time. Additionally, the timer 14 can transmit a signal for resuming the control unit 8 from a power-saving state at a set time. The time of the timer 14 can be adjusted at a predetermined period to reduce errors by a protocol such as NTP via the network transmission/reception unit 12.

Here, in the image forming apparatus 1, the control unit 8 and the image processing unit 10 may be integrally formed like a GPU incorporated CPU, a chip-on-module package, and similar device.

Configuration of Storage Unit 9

Here, a description will be given of the details of the data stored in the storage unit 9. The storage unit 9 stores the account information 90, the operation-suspended-period setting 91, a suspension-time-period setting 92, job suspension information 93, and the jobs 95.

The account information 90 is a database that stores various information for each user account. The various information include a user ID, a password, authority information, an IP address of the terminal 200, an e-mail address, a transmission destination, an address, a credit card number, and similar information. On the account information 90, each user can register various information of the user in advance by inputting from the operation panel unit 6, the terminal of the user, or similar device. Additionally, the user can be registered on the account information 90 as a guest.

The operation-suspended-period setting 91 is a setting of the operation suspended period where the power delivery or the power consumption of the image forming apparatus 1 is reduced or suspended. The operation-suspended-period setting 91 includes scheduled times of start and completion of turning off of the power supply due to a planned blackout, a construction, and similar reason, scheduled times of start and completion of setting an energy-saving mode or turning off of the power supply of the image forming apparatus 1 for power saving, and similar scheduled times. The operation-suspended-period setting 91 ensures a plurality of settings of the times of start and completion of the planned blackout, the energy-saving mode, or similar state by date, hour, minute, second, and similar unit. A periodic time of every day, every week, every month, or every year can be set as the unit. That is, the operation-suspended-period setting 91 ensures a setting of start and completion times to set the energy-saving mode in a predetermined period for power saving. For example, when the energy-saving mode is set during lunch time every day, the operation-suspended-period setting 91 ensures a setting of "start time at 12:00 to ending time at 13:00 from Monday to Friday." The times of the operation-suspended-period setting 91 can be set by automatically acquiring planned-blackout information from the website of an electric power company or similar source by the job control portion 81. Additionally, the operation-suspended-period setting 91 may acquire the input of the user from the operation panel unit 6 or the terminal 200 for setting.

Figure 7:
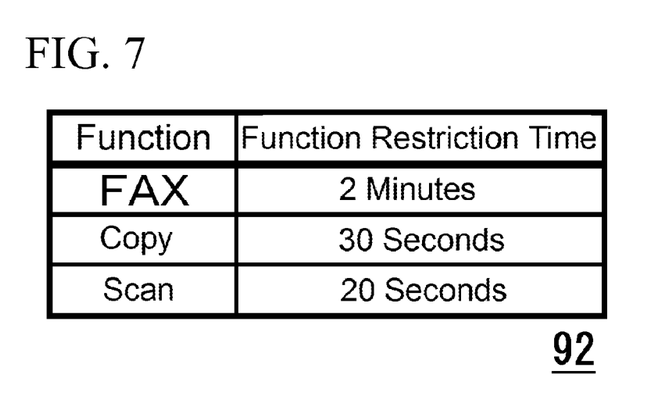
FIG. 7 illustrates a function restriction setting according to the one embodiment.

The suspension-time-period setting 92 is a table to which the time period until the function restriction is performed for each type of job is set. The suspension-time-period setting 92 is referenced when an executable function is restricted as the operation suspended period set by the operation-suspended-period setting 91 approaches. The suspension-time-period setting 92 includes setting of the time period required for suspension of the job for each job. That is, at the time obtained by subtracting the time period set in the suspension-time-period setting 92 from the operation suspended period for each job (at the time before the start time of the operation suspended period by the time period set in the suspension-time-period setting 92), the job control portion 81 restricts the execution of the job.

The job 95 includes the type of job, a command for executing a function, a job identification (ID), a user ID, an execution time, a job output, various data including image data and print data, and similar information. In the various data, the type of job includes, for example, a print job, a scan job, a copy job, and a FAX job. That is, the job 95 is generated as data for printing transmitted from the terminal 200 or similar terminal connected to an external network, data for printing scanned by the document reading unit 2 and processed by image processing in the image processing unit 10, data for facsimile reception/transmission, or similar data. When the job 95 is generated, the control unit 8 adds the job ID in a predetermined unit and adds the user ID of the user who has instructed the execution to the job 95 and then stores the job 95 in the storage unit 9. The execution time of the job 95 is a setting of the start time of the execution of the job 95 that is set by the user or the job control portion 81 when the job 95 is generated. This start time can be set as "promptly", and can additionally be set as a time by timer reservation. The user can also change the start time reserved by the operation panel unit 6 or the terminal 200. The execution of the job 95 is also reserved as "retry" of the output due to a facsimile transmission error, unsuccessful printing due to running out of paper, or similar reason. In this case, the execution time of the job 95 can be set to be after the predetermined period of time from the present time acquired by the timer 14. Here, the execution time of the job 95 may contain the preliminarily calculated completion time of the job based on the type of job and the job output. The job output of the job 95 indicates values of the number of pages, the number of copies, print settings such as aggregate print and duplex printing, and similar parameter. The job output is referenced to calculate the time at which the job is executed.

The storage unit 9 functions as an operation-suspended-period storage unit that stores the operation-suspended-period setting 91. Additionally, the storage unit 9 functions as a job-categorized-suspension-time-period storage unit that stores the suspension-time-period setting 92. Additionally, the storage unit 9 functions as a job-suspension-information storage unit that stores the job suspension information 93. Additionally, the storage unit 9 functions as a job-data storage unit that stores the jobs 95. Additionally, the storage unit 9 stores image data scanned by the document reading unit 2, image data processed by image processing in the image processing unit 10, data of a print document transmitted from a terminal of the user, various files read out from an external recording medium, data of a thumbnail image, and similar data. The storage unit 9 may include a region of the folder for saved files for each user.

Here, it is possible to connect a recording medium brought in by a user to a recording-medium connecting portion so as to use data of a document, image data, and similar data that are stored in this recording medium as the job 95. Additionally, the file that is transmitted from the recording medium or the terminal 200 and then saved in the folder for saved files can also be used as the job 95.

Function Restriction Process During Blackout/Power Saving by Image Forming Apparatus 1

Figure 3:
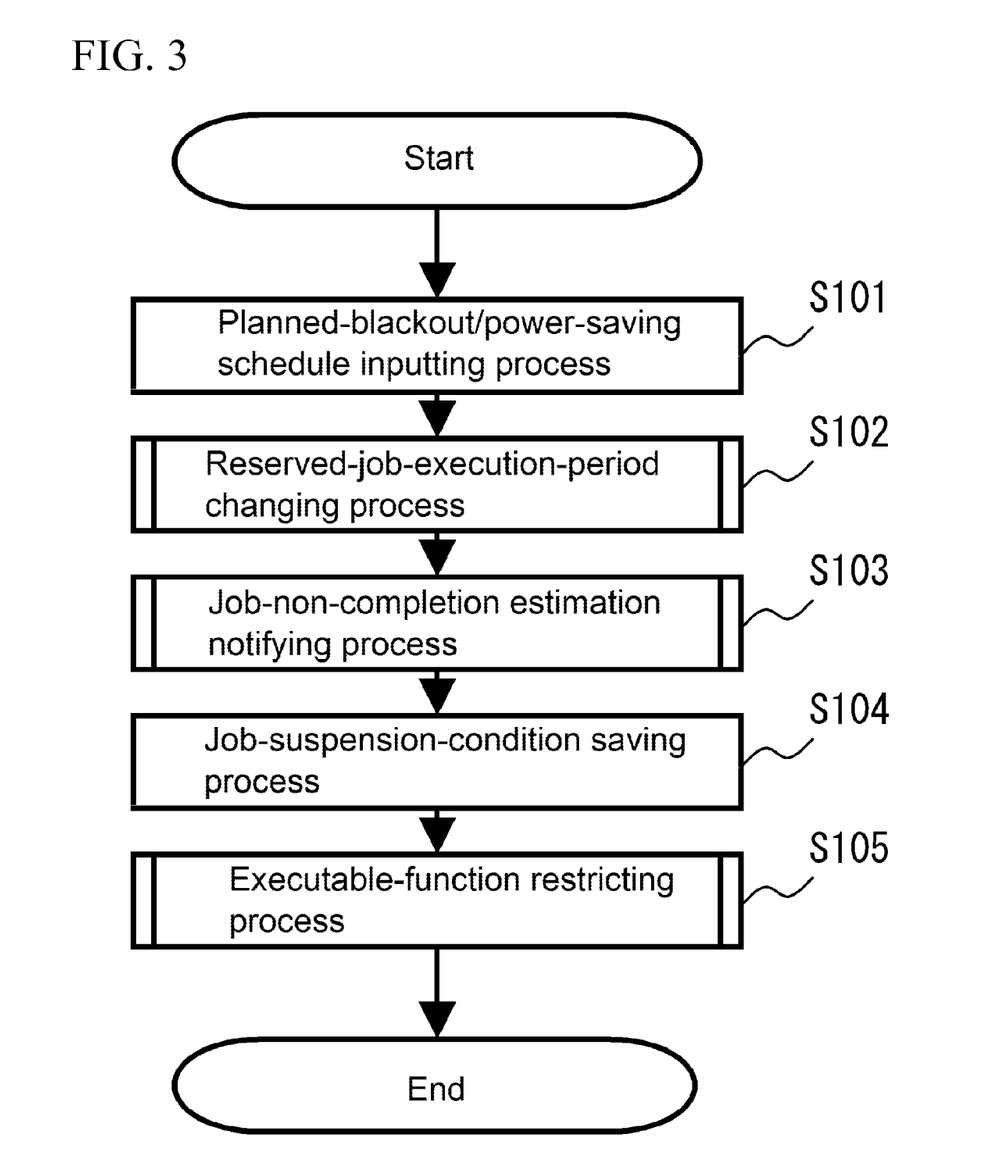
FIG. 3 illustrates a function restriction process during blackout/power saving according to the one embodiment.

Here, a description will be given of a function restriction process during blackout/power saving according to the embodiment of the image forming apparatus 1 of the disclosure with reference to FIG. 3. This function restriction process during blackout/power saving is achieved such that mainly the control unit 8 executes the program stored in the storage unit 9 or similar program using the hardware resources in collaboration with the respective units. The following describes the outline of the function restriction process during blackout/power saving for each step with reference to the flow chart in FIG. 3.

Step S101

Firstly, the job control portion 81 performs a planned-blackout/power-saving schedule inputting process. The job control portion 81 accesses the website on which the schedule of the planned blackout of an electric power company is announced in a predetermined cycle using a URL stored in the storage unit 9, so as to acquire the operation suspended period. For example, the job control portion 81 acquires an html file where the information of the start and ending times of the planned blackout and similar information are written using a tool such as a Wget and analyzes the html file using a parser or similar program so as to acquire the operation suspended period. The job control portion 81 includes the acquired planned-blackout information in the operation-suspended-period setting 91 and stores this information in the storage unit 9. Similarly, the start and ending times of the power saving may be acquired from a server of the company intranet or similar server. When an operation screen for "setting of planned blackout and power saving" or similar screen is called on the operation panel unit 6, the job control portion 81 causes the user to input the operation suspended period, which contains the start and ending times of the schedule of the planned blackout or the power saving, using the operation panel unit 6 so as to acquire the operation suspended period. Also in this case, the job control portion 81 stores the acquired operation suspended period as the operation-suspended-period setting 91 in the storage unit 9. Additionally, when the image forming apparatus 1 is accessed by a web browser or a device driver of the terminal 200, the job control portion 81 similarly sets and stores the operation suspended period as the operation-suspended-period setting 91 in the storage unit 9.

Step S102

Subsequently, the job control portion 81 performs a reserved-job-execution period changing process. At the predetermined period of time before the operation suspended period, the job control portion 81 searches for jobs 95 scheduled to be executed within the operation suspended period. If the job control portion 81 has found such jobs 95, the job control portion 81 changes the start time or the completion time of the execution of the jobs 95 such that the execution of the jobs 95 will complete before the start time of the operation suspended period. The details of this reserved-job-execution period-changing process will be described later.

Step S103

Subsequently, the job control portion 81 performs a job-non-completion estimation notifying process. The job control portion 81 notifies the user about a possibility that the job is not to be completed when the user is attempting to execute the job at a time (for example, at or after the predetermined period of time before the operation suspended period) close to the operation suspended period. For example, when a large amount of printing is to be performed and it is estimated the job is not to be completed before the operation suspended period, the job control portion 81 notifies and makes the user to select whether or not to continue the process. Similarly, the details of this job-non-completion estimation notifying process will be described later.

Step S104

Subsequently, the job control portion 81 performs a job-suspension-condition saving process. The job control portion 81 saves the processing conditions of all the jobs 95 as the job suspension information 93 in the HDD or a non-volatile recording medium such as a flash memory of the storage unit 9 before the start time of the set operation suspended period. For example, when the job 95 is a print job, the job control portion 81 includes the value of the completed output in units of copies or in units of pages in the job suspension information 93 and stores the value in the storage unit 9. For example, when the job 95 is a copy job, the job output is 100 pages×10 copies, the execution is completed up to "page 88 in the second copy", the job control portion 81 includes the information of the notification in the job suspension information 93 and then stores this information in the storage unit 9. That is, the job control portion 81 stores the job output such as the number of printed pages and the number of printed copies as the job suspension information 93 in the storage unit 9.

Step S105

Subsequently, the job control portion 81 performs an executable-function restricting process. The job control portion 81 restricts executable functions of the image forming apparatus 1 as the operation suspended period approaches. For example, when the job control portion determines that an attempted facsimile transmission is not to be completed by the operation suspended period, the job control portion 81 disables the FAX transmission function itself. Similarly, the details of this executable-function restricting process will be described later. Then, the function restriction process during blackout/power saving according to the embodiment of the disclosure is terminated.

Subsequently, the job control portion 81 moves the content of the RAM in the storage unit 9 to the HDD or similar storage at the predetermined period of time before the operation suspended period, to cause the respective units of the image forming apparatus 1 to transition to a power-saving state such as shutdown, hibernation, and standby. In this state, the power delivery to the image forming apparatus 1 is cut and turned off during the planned blackout.

Details of Reserved-Job-Execution-Time Changing Process

Figure 4:
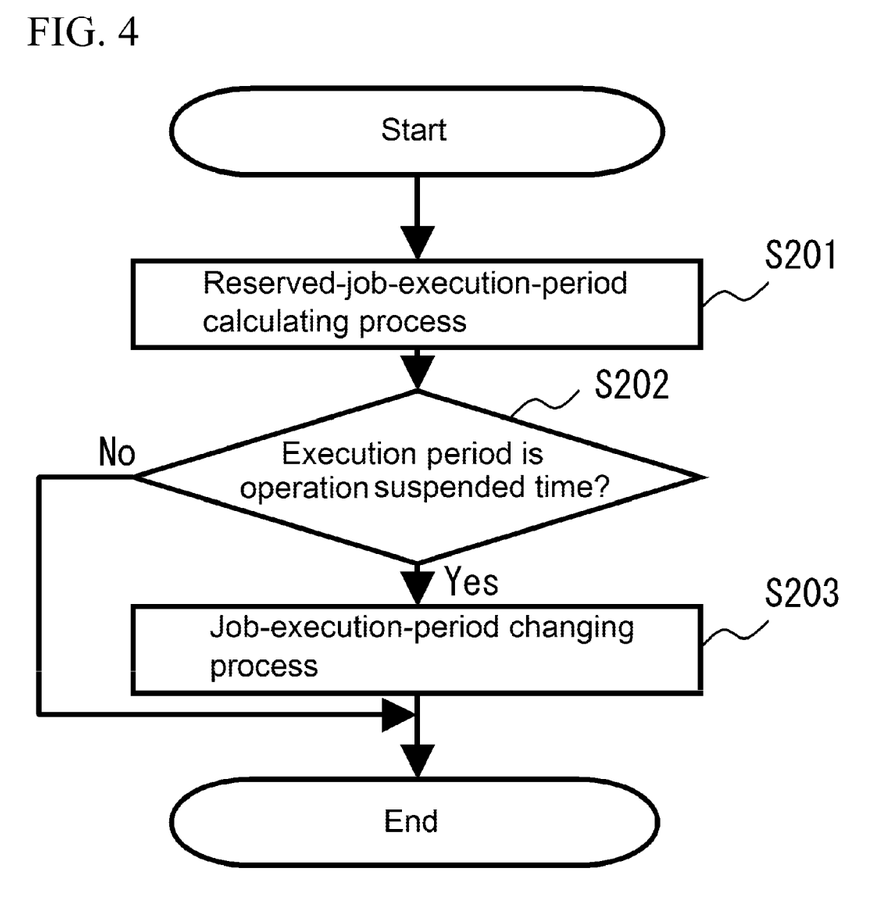
FIG. 4 illustrates a reserved-job-execution-time changing process according to the one embodiment.

Next, a description will be given of a reserved-job-execution-time changing process according to the embodiment of the disclosure in detail with reference to FIG. 4.

Step S201

Firstly, the job control portion 81 performs a reserved-job-execution-period calculating process. The job control portion 81 refers to the jobs 95 stored in the storage unit 9 so as to acquire the start time of the job 95 whose execution is reserved. Additionally, the job control portion 81 calculates the completion time of the execution of the job 95 from the type of job, the type of command, the number of pages included in the various data, and similar data of the job 95. Accordingly, the job control portion 81 calculates the execution period that is a period between the start time and the completion time of the job 95.

Step S202

Subsequently, the job control portion 81 determines whether or not the execution periods of scheduled jobs 95 fall within the operation suspended period. If the period from the start time to the completion time of a job 95 whose execution is scheduled falls within the period from the start time to the ending time of the operation suspended period stored in the operation-suspended-period setting 91, the job control portion 81 makes a determination of "Yes." Otherwise a determination of "No" is made. In case of "Yes," the job control portion 81 advances the process to step S203. In case of "No," the job control portion 81 terminates the reserved-job-execution-time changing process without changing the execution time of the job 95. Accordingly, the job 95 is executed by the control unit 8 at the scheduled execution time.

Step S203

When the execution time of the job 95 is during blackout or power saving, the job control portion 81 performs a job-execution-period changing process. The job control portion 81 changes the start time of the execution time of the job 95 such that the completion time of the execution of the job 95 whose execution is reserved becomes prior to the start time of the operation suspended period. When a plurality of jobs 95 are reserved, the job control portion 81 performs scheduling to change the execution times of the respective jobs 95 such that the respective jobs 95 are arranged in the reserved order as much as possible. This causes the jobs 95 to be executed in the output order intended by the user, thus saving the labor of the user. For example, the job control portion 81 can give first priority to the output order in case of the "retried" job like a FAX transmission job where the communication condition is poor and the transmission was impossible, a print job where printing was impossible due to running out of paper, or similar job. In this case, the job control portion 81 basically ensures a process for aborting the output of the job 95 itself. Here, a possible process is that, for example, the image quality of the print is degraded without changing the start time of the execution time such that the completion time of the job 95 becomes prior to the start time of the operation suspended period. In this case, it is preferred to notify the user about this degraded process based on the account information 90. Then, the reserved-job-execution-time changing process according to the embodiment of the disclosure is terminated.

Details of Job-Non-Completion Estimation Notifying Process

Figure 5:
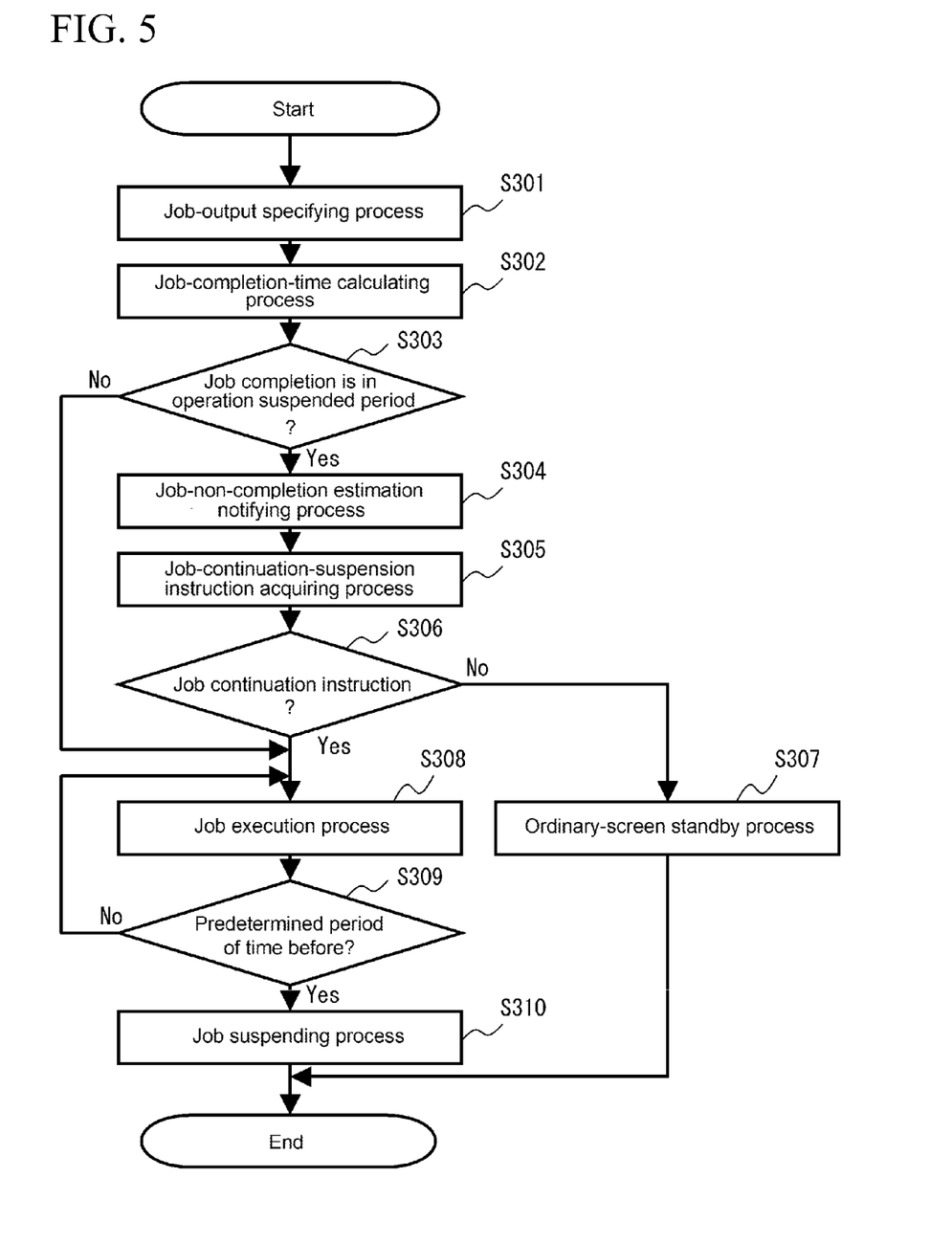
FIG. 5 illustrates a job-non-completion estimation notifying process according to the one embodiment.

Next, a description will be given of the job-non-completion estimation notifying process according to the embodiment of the disclosure in detail with reference to FIG. 5. This is a process executed when a user is attempting to execute a job at a time (for example, at or after the predetermined period of time before the operation suspended period by) close to the operation suspended period or similar case. This is also a process executed when the time spent on execution of the reserved job is long and the execution of the job is not terminated before the start time of the operation suspended period even after the reserved-job-execution-time changing process is performed (when the reserved-job-execution-time changing process cannot be performed) or similar case.

Step S301

Firstly, the job control portion 81 performs a job-output specifying process. When the job control portion 81 has acquired the instruction of the execution of the job such as printing, copying, scanning, and facsimile transmission, the job control portion 81 causes the user to specify the job output containing the number of pages, the number of copies, and similar information from the operation panel unit 6 or the terminal 200 so as to acquire the job output. For example, in case of a copy job, the job control portion 81 acquires the number of pages to be copied and the number of copies that are specified by the user. Here, the job control portion 81 may acquire the number of pages based on the thickness of the original document from a sensor of the document reading unit 2. Alternatively, the job control portion 81 may acquire the number of pages or similar parameter included in the various data of the job 95 as the job output.

Step S302

Subsequently, the job control portion 81 performs a job-completion-time calculating process. The job control portion 81 calculates the completion time of the execution of the job 95 from the type of job of the job 95 and the job output specified by the user. That is, the job control portion 81 can calculate the completion time of the execution of the job 95 based on a predetermined value for each type of job and the job output. For example, in case of a copy job, the job control portion 81 calculates the completion time of copying from the value expressed by the print time per page×the number of pages to be copied×the number of copies.

Step S303

Subsequently, the job control portion 81 determines whether or not the completion time of the job during execution is in the operation suspended period. The job control portion 81 acquires the current time from the timer 14. Here, when it is estimated that the time, which is obtained by adding the calculated completion time of the execution of the job 95 in step S302 above and the acquired current time, exceeds the start time of the operation suspended period, the job control portion 81 makes a determination of "Yes." In the case of the copy job, the job control portion 81 makes a determination of "Yes" when the copy completion time is after the start time of the operation suspended period. Otherwise the job control portion 81 makes a determination of No. In case of "Yes," the job control portion 81 proceeds the process to step S304. In case of "No," the job control portion 81 proceeds the process to step S308.

Step S304

When the completion time of the job during execution is within the operation suspended period, the job control portion 81 performs a job-non-completion estimation notifying process. The job control portion 81 displays notification that the job completion is impossible on the operation panel unit 6 or the terminal 200. For example, in case of a copy job, the job control portion 81 displays a message of "copying will not be completed before planned blackout start" on the displaying portion of the operation panel unit 6 to notify the user.

Step S305

Subsequently, the job control portion 81 performs a job-continuation-suspension instruction acquiring process. The job control portion 81 displays a dialog box or similar interface that ensures selecting whether to continue the process of the job on the operation panel unit 6 or the terminal 200 in order to acquire the instruction of the user. For example, in case of a copy job, the job control portion 81 displays a dialog box asking "continue copying? Y/N" on the displaying portion of the operation panel unit 6 to receive an instruction from the button, the touch panel, or similar interface.

Step S306

Subsequently, the job control portion 81 determines whether or not the user has instructed the continuation of the process of the job. The job control portion 81 makes a determination of "Yes" when the instruction of the job continuation is acquired. In case of the copy job, the job control portion 81 makes a determination of "Yes" when the instruction of the continuation of the copy from the user is acquired. Otherwise, that is, when the user instructs abortion of the process of the job, the job control portion 81 makes a determination of "No." In case of "Yes," the job control portion 81 proceeds the process to step S308. In case of "No," the job control portion 81 proceeds the process to step S307.

Step S307

When the user instructs abortion of the process of the job, the job control portion 81 performs an ordinary-screen standby process. The job control portion 81 aborts the execution of the job 95 and cancels the job 95 and displays an ordinary screen waiting for job selection on the operation panel unit 6 or the terminal 200. Subsequently, the job control portion 81 terminates the job-non-completion estimation notifying process.

Step S308

When the user instructs continuation of the process of the job, the job control portion 81 performs a job execution process. The job control portion 81 continuously executes the job during execution until the predetermined period of time before the start time of the operation suspended period. As this predetermined period of time, a predetermined period of time required for job suspension can be set. Here, the job control portion 81 may refer to the suspension-time-period setting 92 regarding this predetermined period of time, so as to select a different time period for each type of job. For example, in case of a copy job, the job control portion 81 continuously executes the copy.

Step S309

Subsequently, the job control portion 81 determines whether or not the current time is at the predetermined period of time before the start time of the operation suspended period (for example, the predetermined period of time that is stored in the suspension-time-period setting 92 and required for job suspension for each type of job). The job control portion 81 makes a determination of "Yes" when the current time is at the time before the start time by the predetermined period of time. Otherwise the job control portion 81 makes a determination of "No." In case of "Yes," the job control portion 81 proceeds the process to step S310. In case of "No," the job control portion 81 returns the process to step S308 and continues the process of the job 95 until the current time is at the predetermined period of time before the start time.

Step S310

When the current time is at the predetermined period of time before the start time of the operation suspended period, the job control portion 81 performs a job suspending process. The job control portion 81 aborts the execution of the job 95, and issues an instruction such that the number of pages, the number of copies, and similar information so far in the execution are saved in the job suspension information 93 in step S104. Then, the job-non-completion estimation notifying process according to the embodiment of the disclosure is terminated.

Details of Executable-Function Restricting Process

Figure 6:
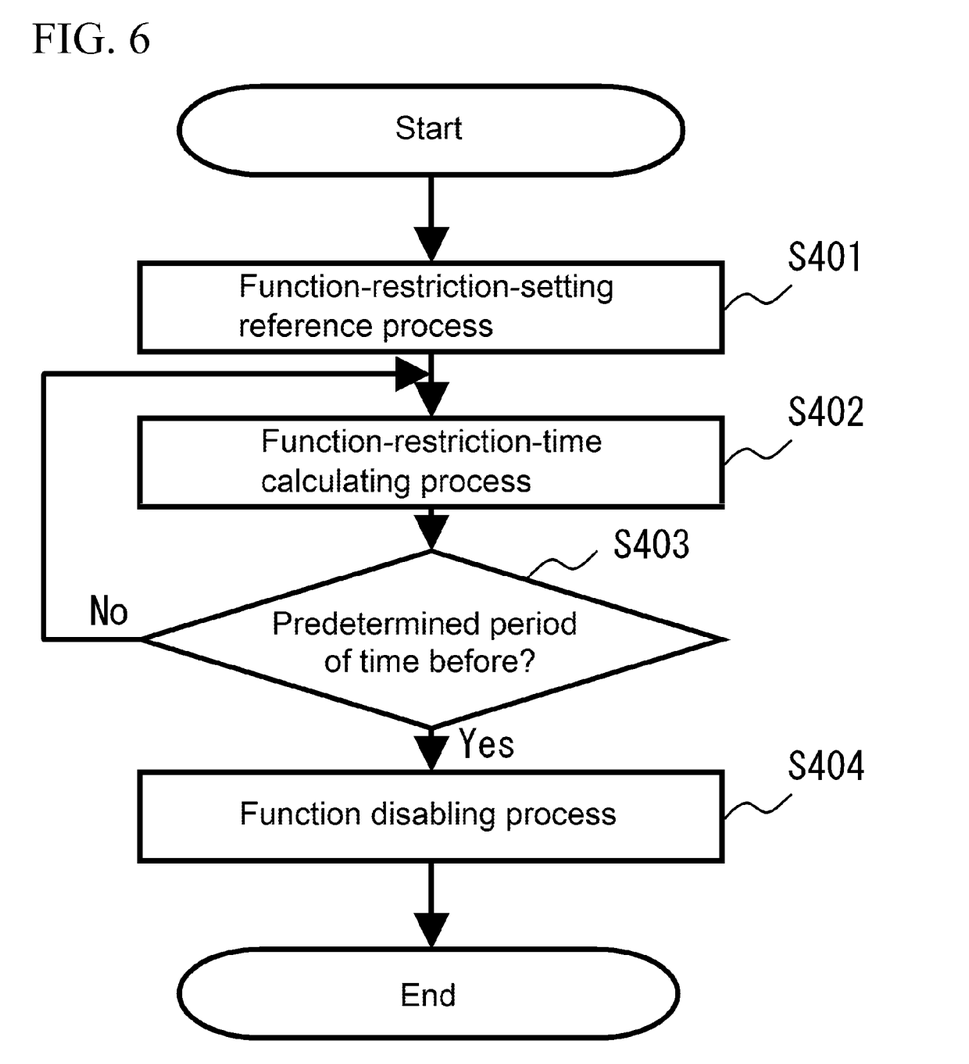
FIG. 6 illustrates an executable-function restricting process according to the one embodiment.

Next, a description will be given of the executable-function restricting process according to the embodiment of the disclosure in detail with reference to FIG. 6 and FIG. 7.

Step S401

Firstly, the job control portion 81 performs a function-restriction-setting reference process. The job control portion 81 reads out the suspension-time-period setting 92 stored in the storage unit 9. With reference to FIG. 7, the suspension-time-period setting 92 includes set values of, for example, two minutes in case of a FAX job, 30 seconds in case of a copy job, and 20 seconds in case of a scan job. These values indicate the time periods required until the functions of the respective jobs are suspended.

Step S402

Subsequently, the job control portion 81 performs a function-restriction-time calculating process. The job control portion 81 acquires the current time from the timer 14 to calculate whether or not the current time is the time at the predetermined period of time before the start time of the operation suspended period for each type of job based on the read suspension-time-period setting 92. That is, the job control portion 81 calculates the time obtained by subtracting the time period stored in the suspension-time-period setting 92 from the start time of the operation suspended period stored in the operation-suspended-period setting 91 for each type of job so as to compare this calculated time with the current time acquired from the timer 14.

Step S403

Subsequently, the job control portion 81 determines whether or not the current time has reached the point that is the predetermined time period (the predetermined period of time that is stored in the suspension-time-period setting 92 and required for job suspension for each type of job) ahead of the starting point of the operation suspended time period. When the current time has reached the point that is the predetermined time period ahead of the starting point of the operation suspended period, the job control portion 81 makes a determination of "Yes" for each job. Otherwise the job control portion 81 makes a determination of "No." In case of "Yes," the job control portion 81 advances the process to step S404. In case of "No," the job control portion 81 returns the process to step S402. Accordingly, the job control portion 81 continues calculation regarding the predetermined period of time while performing execution or standby of the jobs.

Step S404

When the current time is the time at the predetermined period of time before the start time of the operation suspended period, the job control portion 81 performs a function disabling process. When the current time becomes the time at the predetermined period of time before the start time of the operation suspended period, the job control portion 81 disables the function corresponding to the above-described predetermined type of job. For example, the job control portion 81 grays out the corresponding function in the operation panel unit 6 and turns off the instruction button of the corresponding job, or displays a message of "XX seconds before power saving time. XX function is disabled." Then, the executable-function restricting process according to the embodiment of the disclosure is terminated.

Resume Process by Image Forming Apparatus 1

Figure 8:
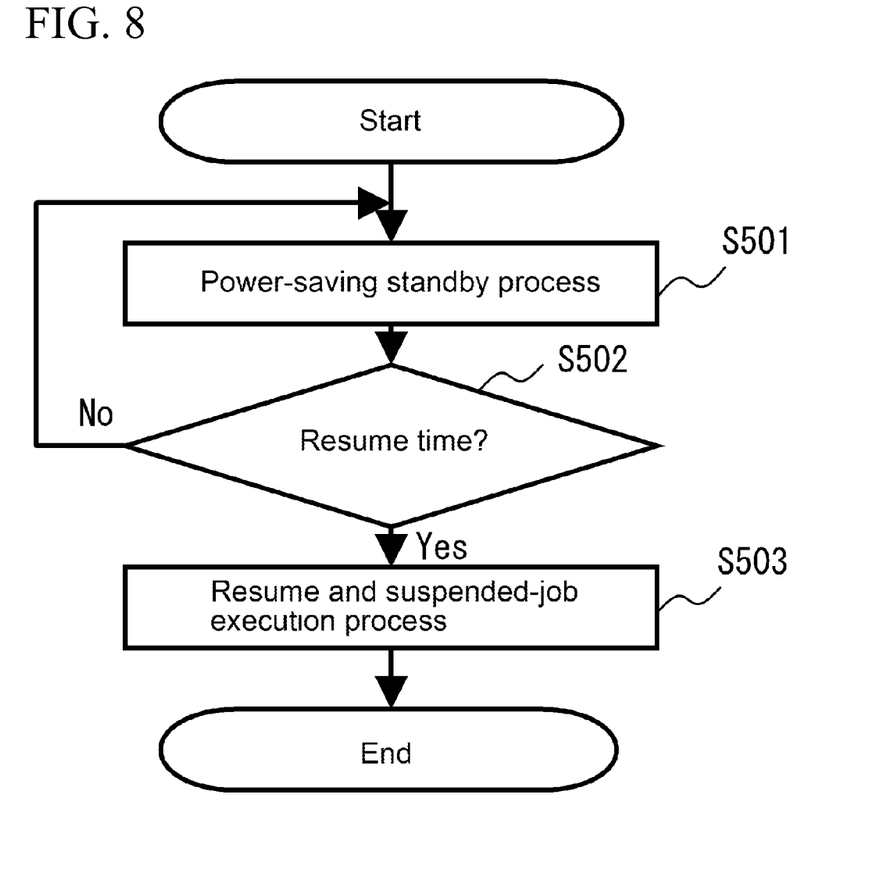
FIG. 8 illustrates a resume process according to the one embodiment.

Here, a description will be given of a resume process in the embodiment of the image forming apparatus 1 according to the disclosure with reference to FIG. 8. Also, this resume process is achieved such that mainly the control unit 8 executes the program stored in the storage unit 9 or similar program using the hardware resources in collaboration with the respective units. The following describes the resume process for each step in detail with reference to the flow chart in FIG. 8.

Step S501

Firstly, the job control portion 81 performs a power-saving standby process. When the current time becomes the time within the operation suspended period set with the operation-suspended-period setting 91, the job control portion 81 suspends the power supply to units with large power consumption, for example, the image forming unit 7 and the operation panel unit 6 so as to set these units to an operation suspended state such as a power-saving mode that decreases the clock frequency of the control unit 8. During the planned blackout, the power delivery is completely turned off and the image forming apparatus 1 becomes the operation suspended state.

Step S502

Subsequently, the job control portion 81 determines whether or not the current time is a resume time. The job control portion 81 acquires the current time from the timer 14, and then makes a determination of "Yes" when the ending time of the operation suspended period has passed. Additionally, when the job control portion 81 resumes from a power-off state such as planned blackout and then a direct power supply is turned on, the job control portion 81 also makes a determination of "Yes." Otherwise the job control portion 81 makes a determination of "No." In case of "Yes," the job control portion 81 proceeds the process to step S503. In case of "No," the job control portion 81 returns the process to step S501 and continues the standby process.

Step S503

When the current time becomes the resume time, the job control portion 81 performs a resume and suspended-job execution process. The job control portion 81 resumes from a stand-by state after a lapse of the operation suspended period. At this time, the job control portion 81 may read out the hibernation file stored in the storage unit 9 to the RAM or may perform initialization or a resume process of the respective units. Subsequently, the job control portion 81 refers to the job suspension information 93 and automatically continues the process depending on the saved processing condition of the job 95. That is, during resuming from the planned blackout or the power-saving state, the job control portion 81 automatically executes the uncompleted job 95 in the middle of the job 95 based on the processing condition saved in the job suspension information 93 of the storage unit 9. For example, when the job suspension information 93 includes the information that the suspended job 95 is a print job and printing is completed up to "page 88 in the second copy", the job control portion 81 resumes printing from "page 89 in the second copy." Then, the process according to the embodiment of the disclosure is terminated.

With the configuration as described above, the following effects can be obtained. The image forming apparatus 1 of the disclosure can reserve a time for executing a job. The image forming apparatus 1 includes the storage unit 9 and the job control portion 81. The storage unit 9 stores the operation-suspended-period setting 91 and stores the job 95 containing the execution time. The job control portion 81 calculates the execution period of the job 95 using the execution time of the reserved job 95 read out from the storage unit 9 and the completion time calculated from the type of job. The job control portion 81 changes the execution time of the reserved job to be prior to the operation suspended period when the execution period of the reserved job 95 overlaps the operation suspended period at the predetermined period of time before the operation suspended period stored in the storage unit 9. This configuration eliminates the need for the backup power supply or special hardware, thus reducing production cost and electric power consumption. Additionally, eliminating the need for the backup power supply does not cause inconvenience such as cancellation of the reserved job due to running out of the backup power supply caused by a prolonged period where the electric power supply from the main power supply is suspended. Additionally, the job control portion 81 automatically acquires the information of the planned blackout or similar information. This provides the effect that saves the labor of the setting.

In the image forming apparatus 1 according to the embodiment of the disclosure, if the execution of a scheduled job 95 will not complete at the operation suspended period of the operation-suspended-period setting 91 stored in the storage unit 9, the job control portion 81 shuts down the uncompleted job 95 in course of the job 95. The job control portion 81 stores the processing condition of the suspended job 95 as the job suspension information 93 in the storage unit 9. The job control portion 81 reads out the job suspension information 93 stored in the storage unit 9 after resumption and continues the job 95 that had been shut down. Accordingly, the remaining job will be automatically executed after resuming from a planned power outage. Thus, the user need not execute the job again. That is, even if a planned power outage is carried out during job execution, for example, during a large amount of printing, the subsequent course of the printing can be performed after resuming. This improves the convenience of the user.

In the image forming apparatus 1 according to the embodiment of the disclosure, the job control portion 81 notifies incompletion of the execution of the job when receiving the execution instruction of the job at or after the predetermined period of time before the operation suspended period of the operation-suspended-period setting 91 stored in the storage unit 9. This can provide, for example, notification that a large amount of printing is not possible to the user. Accordingly, the image forming apparatus 1 is not likely to be used in the time zone of power saving. This improves the power saving effect.

In the image forming apparatus 1 according to the embodiment of the disclosure, the storage unit 9 stores the suspension-time-period setting 92 required for suspension of the job for each type of job. The job control portion 81 restricts the execution for each type of job at the time obtained by subtracting the time period included in the suspension-time-period setting 92 for each type of job as the predetermined period of time from the operation suspended period stored in the storage unit 9. Accordingly, restricting the function executable by the user causes the user to know the disabled function. Thus, the user can determine use of a different function or unit. This improves the convenience for the user.

Here, the image forming apparatus of the disclosure can also perform setting of the operation suspended period, setting of the reserved time of the execution of the job, or similar setting using driver software or dedicated application software of a terminal such as a PC and a smart phone.

The disclosure is applicable to an information processing apparatus other than the image forming apparatus. That is, a possible configuration employs a network scanner, a server to which a scanner is additionally connected via USB or similar interface, and similar device.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus, comprising:
   an operation-suspended-period storage unit storing a start time and an end time of an operation-suspended period during which operation of the image forming apparatus is suspended;
   a job-data storage unit storing jobs in which execution start times for jobs whose execution is scheduled are contained;
   a job-execution-period calculation unit configured to acquire from the job-data storage unit, at a predetermined period of time before the operation-suspended period stored in the operation-suspended-period storage unit, the execution start time of any execution-scheduled jobs, and calculate, based on job type, a job-execution period being from the acquired execution start time until execution-completion time of the any execution-scheduled jobs;

a job-execution-period changing unit configured to change, at the predetermined period of time before the operation-suspended period stored in the operation-suspended-period storage unit, the execution period for the any execution-scheduled jobs to be prior to the operation-suspended period, such that the execution-completion time for the any execution-scheduled jobs will be prior to the start time of the operation-suspended period, if the execution period that the job-execution-period calculation unit has calculated for the any execution-scheduled jobs overlaps the operation-suspended period;

a job-categorized-suspension-time-period storage unit storing a time period required for shutting down of a job for each type of job, the job types including fax jobs, copy jobs, and scan jobs; and a job-execution restricting unit configured to restrict job execution for each type of job at a period obtained by subtracting the time period stored in the job-categorized-suspension-time-period storage unit from the start time of the operation-suspended period.

2. The image forming apparatus according to claim 1, further comprising:

a job-execution suspending unit configured to suspend, if execution of the any execution-scheduled jobs will not be completed before the operation-suspended period, an uncompleted job in the course of the job;

a job-suspension-information storage unit configured to store processing status of the job suspended by the job-execution suspending unit as job suspension information; and a post-resume job continuing unit configured to read out, after the ending time of the operation-suspended period, the job suspension information stored in the job-suspension-information storage unit, and continue the suspended job.

3. The image forming apparatus according to claim 1, further comprising a job-non-completion estimation notifying unit configured to report incompletion of execution of the job if the image forming apparatus has received an execution instruction for the job at or after the predetermined period of time before the operation-suspended period.

4. The image forming apparatus according to claim 1, further comprising an operation-suspended-period acquiring unit configured to acquire the start time and the ending time of the operation-suspended period, and store the acquired times into the operation-suspended-period storage unit.

5. An image forming method executed in an image forming apparatus including an operation-suspended-period storage unit, a job-data storage unit, and a job-categorized-suspension-time-period storage unit, the image forming method comprising:

storing, in the operation-suspended-period storage unit, a start time and an end time of an operation-suspended period during which image-forming operations are suspended;

storing, in the job-data storage unit, jobs in which execution start times for jobs whose execution is scheduled are contained;

acquiring from the job-data storage unit, at a predetermined period of time before the operation-suspended period stored in the operation-suspended-period storage unit, the execution start time of any execution-scheduled jobs, and calculate, based on job type, a job-execution period being from the acquired execution start time until execution-completion time of the any execution-scheduled jobs;

changing, at the predetermined period of time before the operation-suspended period stored in the operation-suspended-period storage unit, the execution period for the any execution-scheduled jobs to be prior to the operation-suspended period, such that the execution-completion time for the any execution-scheduled jobs will be prior to the start time of the operation-suspended period, if the execution period calculated for the any execution-scheduled jobs overlaps the operation-suspended period;

storing, in the job-categorized-suspension-time-period storage unit, a time period required for shutting down of a job for each type of job, the job types including fax jobs, copy jobs, and scan jobs; and restricting job execution for each type of job at a period obtained by subtracting the stored time period in the job-categorized-suspension-time-period storage unit from the start time of the operation-suspended period.

6. The image forming method according to claim 5, further comprising:

suspending, if execution of the any execution-scheduled jobs will not be completed before the operation-suspended period, an uncompleted job in the course of the job;

storing processing status of the job suspended by the job-execution suspending unit as job suspension information; and reading out, after the ending time of the operation-suspended period, the stored job suspension information, and continuing the suspended job.

7. The image forming method according to claim 5, further comprising reporting incompletion of execution of the job if an execution instruction for the job has been received at or after the predetermined period of time before the operation-suspended period.

8. The image forming method according to claim 5, further comprising:

acquiring the start time and the ending time of the operation-suspended period; and storing the acquired times into the operation-suspended-period storage unit.

\* \* \* \* \*